US012056763B2

(12) United States Patent
Goel et al.

(10) Patent No.: US 12,056,763 B2
(45) Date of Patent: *Aug. 6, 2024

(54) SYSTEMS AND METHODS FOR DATA ENRICHMENT

(71) Applicant: Collibra Belgium BV, Brussels (BE)

(72) Inventors: Satyender Goel, Chicago, IL (US); James B. Cushman, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 20 days.

This patent is subject to a terminal disclaimer.

(21) Appl. No.: 17/103,720

(22) Filed: Nov. 24, 2020

(65) Prior Publication Data

US 2022/0164873 A1    May 26, 2022

(51) Int. Cl.
*G06Q 40/00* (2023.01)
*G06F 16/22* (2019.01)
(Continued)

(52) U.S. Cl.
CPC ............. *G06Q 40/03* (2023.01); *G06F 16/22* (2019.01); *G06Q 50/26* (2013.01); *H04L 9/0643* (2013.01)

(58) Field of Classification Search
CPC ........ G06Q 40/00; G06Q 40/02; G06Q 40/04; G06Q 40/08; G06Q 20/02; H04L 2209/38;
(Continued)

(56) References Cited

U.S. PATENT DOCUMENTS 7,809,659 B1 * 10/2010 Paiz ...................... G06F 16/954
706/45
10,623,406 B2 * 4/2020 Maker ................... H04L 63/083
(Continued)

FOREIGN PATENT DOCUMENTS

| WO | WO-0146889 A2 * | 6/2001 | ............. G06Q 20/02 |
| WO | WO-2016049437 A1 * | 3/2016 | ........... G06F 16/215 |
| WO | 2017194214 A1 | 11/2017 | |

OTHER PUBLICATIONS

A Hierarchical Bitmap Indexing Method for Similarity Search in High-Dimensional Multimedia Databases. Images Journal of Information Science & Engineering. Mar. 2010, vol. 26 Issue 2, p. 393-407 (Year: 2010).*

(Continued)

*Primary Examiner* — Richard C Weisberger
(74) *Attorney, Agent, or Firm* — Perkins Coie LLP

(57) ABSTRACT

The present disclosure is directed to systems and methods for enriching data. Specifically, the systems and methods disclosed enable the enrichment of data via matching, identifying composite data records, and utilizing Reference Source datasets. In one example aspect, Customer data is tokenized and then subsequently transmitted to a third-party Consolidation Platform. The Customer tokens may comprise multiple token records, wherein the multiple token records are displayed in the form of a bitmap. The bitmap may indicate which attributes in a Customer record may be present or absent. The composited Customer token records may then be matched to a Reference Source token set, wherein the matching analysis identifies missing data attributes in the Customer token set that the Customer may or may not already possess. The missing data attributes may be populated and/or updated in a Customer environment based on the Reference Source token set. In other example aspects, a data quality score may be assigned to each data attribute.

17 Claims, 8 Drawing Sheets

(51) Int. Cl.
*G06Q 40/03* (2023.01)
*G06Q 50/26* (2012.01)
*H04L 9/06* (2006.01)

(58) Field of Classification Search
CPC . H04L 9/0643; G06F 21/6236; G06F 21/6254
See application file for complete search history.

(56) References Cited

U.S. PATENT DOCUMENTS

| | | | |
|---|---|---|---|
| 11,694,093 B2* | 7/2023 | Perez | G06N 5/022 |
| | | | 706/12 |
| 2002/0095397 A1 | 7/2002 | Koskas | |
| 2004/0107203 A1* | 6/2004 | Burdick | G06F 16/2365 |
| 2009/0240568 A1* | 9/2009 | Ramer | G06F 16/68 |
| | | | 705/35 |
| 2015/0026027 A1* | 1/2015 | Priess | G06Q 20/4016 |
| | | | 705/35 |
| 2016/0092557 A1* | 3/2016 | Stojanovic | G06F 16/248 |
| | | | 707/723 |
| 2018/0198602 A1 | 7/2018 | Duffy et al. | |
| 2019/0095644 A1* | 3/2019 | Park | G05B 15/02 |
| 2020/0184100 A1 | 6/2020 | Ong et al. | |
| 2020/0201940 A1 | 6/2020 | Nelson et al. | |

OTHER PUBLICATIONS

International Search Report and Written Opinion mailed Mar. 10, 2022 for International Patent Application No. PCT/EP2021/082468, 15 pages.

* cited by examiner

SYSTEMS AND METHODS FOR DATA ENRICHMENT

CROSS-REFERENCE TO RELATED APPLICATION(S)

This present application is related to the Applicant's applications: U.S. patent application Ser. No. 16/844,927, entitled "CONTEXT DRIVEN DATA PROFILING"; U.S. patent application Ser. No. 16/776,293, entitled "SYSTEMS AND METHOD OF CONTEXTUAL DATA MASKING FOR PRIVATE AND SECURE DATA LINKAGE"; and U.S. patent application Ser. No. 17/103,751, entitled "SYSTEMS AND METHODS FOR UNIVERSAL REFERENCE SOURCE CREATION AND ACCURATE SECURE MATCHING." The forgoing applications are hereby incorporated by reference herein in their entireties.

TECHNICAL FIELD

The present disclosure relates to enabling value-added data enrichment.

BACKGROUND

Entities maintain large amounts of data that may be disorganized and/or incomplete. For example, an entity may maintain more than one incomplete record related to a subject, such as an individual, product, organization, etc. One record may contain a subject's address, email, gender, and geographic location, while the other record may contain a subject's name, address, phone number, date-of-birth, and credit card information. Each of these records may be incomplete. Similar incomplete records may exist for products and organizations. Currently, entities desiring to reconcile these disjointed records typically must manually combine these records, which results in inefficient and time-consuming processes, as well as potential exposure to personally identifiable information.

Another issue that entities face is ensuring data integrity of the records they may possess. For example, an entity may have two incomplete records seemingly associated with the same data subject. However, one record may list a different email address or phone number than the other. Such data discrepancies decrease the integrity of data records and make it more difficult for an entity to reconcile multiple, incomplete data records because the entity may be unsure which record is actually correct. Furthermore, an entity may be unsure to what extent a certain record may be correct. Modern day enterprises are hampered when it comes to accurate data collection and reconciliation.

As such, there is an increased need for systems and methods that can address the challenges of modern-day data collection and reconciliation, including the inefficiency of matching multiple incomplete records to the same data subject, the loss of integrity when records are inconsistent, and the potential exposure of personally identifiable information (PII) when such attempts to match and reconcile data records are made.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following figures.

DETAILED DESCRIPTION

Figure 1:
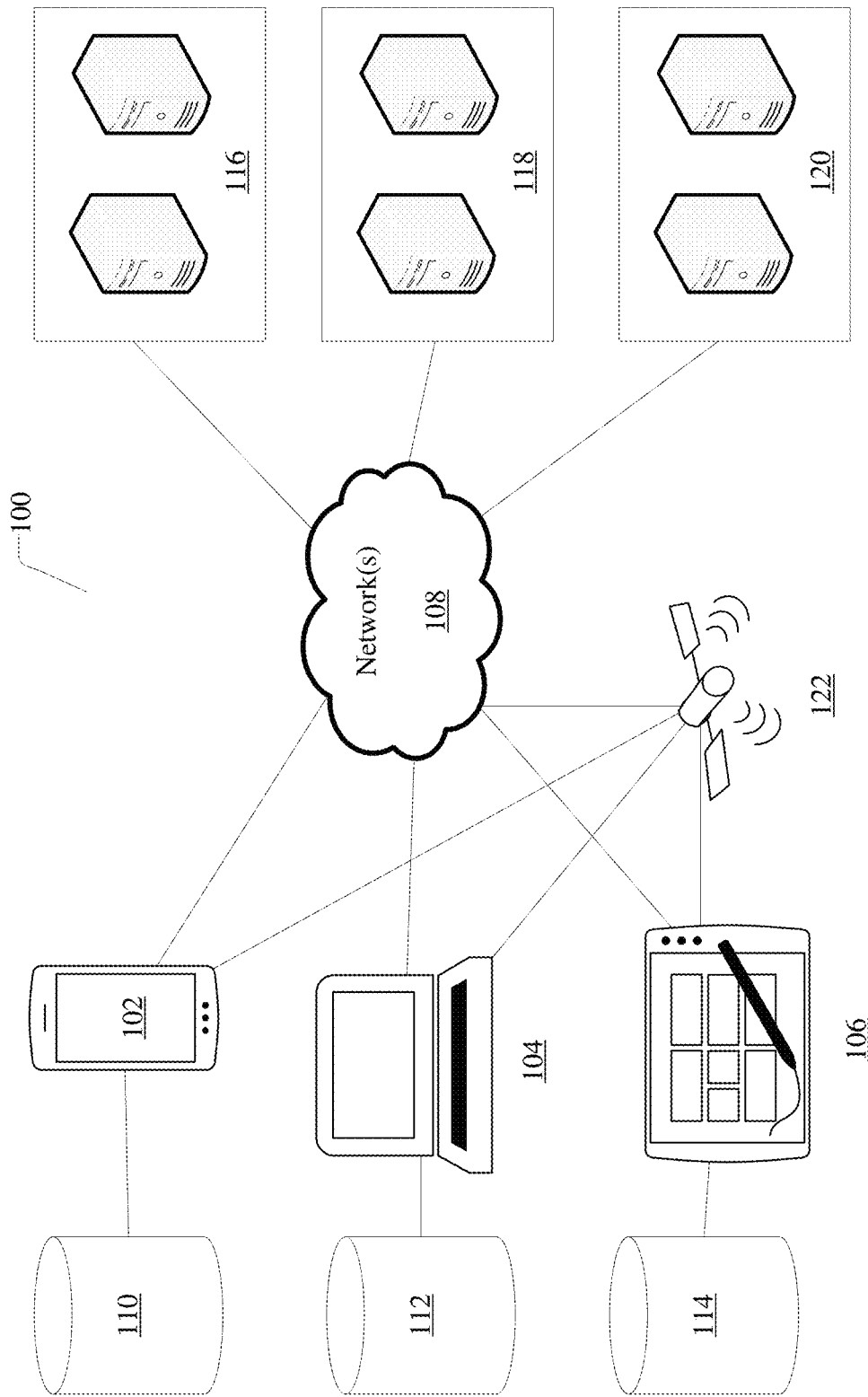
FIG. 1 illustrates an example of a distributed system for consolidating and enriching data, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with data matching, data profiling, data masking, data consolidating, and data enrichment. Data matching processes can be used to generate insights into data that may increase data quality. For example, a data insight can include duplicate or multiple instances of data attributes within a domain and across domains, including a percentage overlap. Specifically, two data records may be associated with the same data subject. Data profiling may indicate that these two records overlap to a certain extent and may also highlight any similarities or differences in the records. Furthermore, data profiling processes may include data insights, which may include a data quality report from normalization and standardization (i.e., what percent is standard versus non-standard) or trends based on label processing (e.g., records with the same home address).

Data masking may refer to the hashing and/or encryption of client-specific information. Through this application, "client" may refer to the Customer and/or the Reference Source. In order for an entity to transmit sensitive data (e.g., PII) to a third-party (e.g., Consolidation Platform), the data usually should be tokenized. In some examples described here, client-specific information may be first hashed and encrypted and then uploaded to a secure server. The tokenized information may be retrieved from the secure server and analyzed. The tokenized client-specific information (i.e., "client tokens") may be tokenized using a combination of hash (one way compression function) and/or encrypted, wherein the hash code may include an additional computer-generated Secure Hash Algorithm (SHA2 512/256) salt. Other hashing and encryption methods may be used, including but not limited to, SHA2 348, SHA3, TripleDES, Twofish encryption algorithms, Blowfish encryption algorithms, Advanced Encryption Standard (AEs), IDEA encryption algorithm, MD5 encryption algorithms, and/or RSA security encryption algorithms. When the third-party server receives information transmitted from a Customer or Reference Source, the information is in the form of tokens. In other words, the raw data from the Customer and/or Reference Source (i.e., "client") is hashed and encrypted prior to being transmitted to the third-party secure server. The Consolidation Platform does not receive or process raw data.

In some example aspects, a first label included in a listing of anonymized labels that corresponds to a type of information in a tokenized attributed based on an identified classifier may be included. The label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data. To the third-party Consolidation Platform, the actual, unencrypted attribute or classifier may be unknown due to the tokenization of the data. For example, a certain attribute may refer to a data subject's address and have a label of "Address," but once labelized, this label may be token "La1" to the third-party Consolidation Platform. Further description of this process can be found in U.S. patent application Ser. No. 16/844,927, which is incorporated by reference in its entirety.

Data consolidating refers to consolidating two or more data records to create a single data record. For instance, a data record may include the data attributes of Name, DOB, Gender, and Email address. Another data record may include the data attributes of Name, Gender, Home address, and Phone number. If these two records are consolidated, then a single data record may be created that includes the data attributes of Name, DOB, Gender, Email address, Home address, and Phone number. Once consolidated, the consolidated data record may be known as a "composite."

A data composite may be useful to entities that may have multiple data records associated with a single data subject. For example, a bank may have a data record for a data subject's checking account and a data record for that same data subject's home loan. Both of these data records may include overlapping information, but one data record may include certain data attributes that the other data record does not include. As such, creating a composite of these data records may be beneficial to the entity, resulting in greater efficiency and higher levels of data integrity.

As described herein, an entity may utilize the systems and methods presented to enrich its data. For instance, a bank may have certain data records associated with certain data subjects. Each data attribute may receive a data quality (DQ) score. The DQ score may indicate to the entity to what extent the data attribute is complete. The aggregated DQ scores of independent attributes may make up a "Value Score" for each data record. For instance, an organization may have five different data records associated with a single data subject. If each of those five data records has the same Gender data attribute listed for each of the data records, the DQ score for the Gender attribute may be relatively high (e.g., 90/100). However, if only one of the five data records has the data attribute of Social Security Number (SSN), then that data attribute may receive a relatively low DQ score (e.g., 30/100), since the entity may not have other corroborating data to verify the integrity of that data attribute for that specific data subject.

To address this issue of low DQ scores and increase data integrity, the systems and methods presented herein utilize Reference Sources to corroborate data records and fill in potential missing data attributes for a data record. A Reference Source is an entity that has data that is used as a reference point. For example, a Reference Source may be a "trusted" source, like a credit bureau, a bank, and/or a government entity. However, because "trust" is subjective, for purposes of this application, a Reference Source is any source that is used as a reference for comparison against another source (e.g., Customer source). For example, a Customer may have multiple data records for a data subject, but some data attributes may be missing. The Customer may hash and encrypt this data (i.e., transform the raw data into tokens) and then upload the tokens to a secure server where a third-party Consolidation Platform may access the Customer tokens. Additionally, a Reference Source may have complete and verified records (i.e., "trusted" records) that are hashed and encrypted (i.e., tokenized) and then uploaded to a secure server managed by the Consolidation Platform. The third-party Consolidation Platform may access the Reference Source tokens. The third-party Consolidation Platform may then enable the enrichment of the Customer data by matching the Customer tokens to the Reference Source tokens.

In some aspects, Customer tokens and Reference Source tokens may be received by the system. The Customer tokens and Reference Source tokens may be analyzed and compared. The results of the analysis and comparison may reveal various deficiencies in the Customer tokens that may be remedied by the Reference Source tokens when and if the Reference Source transmits those data attributes to the Customer. Certain tokenized data attributes of the Customer tokens may be identified as having low DQ scores and/or may be completely missing. The data attributes with low DQ scores and/or that may be missing may be populated by the Reference Source tokens in the Customer environment. Specifically, the third-party Consolidation Platform enables the enrichment and consolidation of data, but the actual enriching and consolidating of the data occurs in the Customer Environment.

Accordingly, the present disclosure provides a plurality of technical benefits including but not limited to: enabling more efficient use of electronic resources for data matching, consolidating, and enabling data enrichment; providing more efficient storage management, since the matching, consolidating, and enrichment of a dataset may occur at a single third-party server; decreasing potential exposure of sensitive data, since all data transmitted to the third party servers is tokenized (i.e., hashed and encrypted); and decreasing manual overload of electronic devices, since the data matching, consolidating, and enrichment occur via computing devices running intelligent algorithms to identify deficiencies in a dataset and remedying those deficiencies from a Reference Source dataset, among other examples.

FIG. 1 illustrates an example of a distributed system for consolidating and enriching data, as described herein.

Example system 100 presented is a combination of interdependent components that interact to form an integrated whole for consolidating and enriching data. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download a third-party tokenization software program via network(s) 108 that may be applied to the client-specific data. The client-specific data may be stored in local databases 110, 112, and 114. Once tokenized, the client-specific data is transformed into "tokens," and these tokens may be transmitted via network(s) 108 and/or satellite 122 to server(s) 116, 118, and/or 120. Server(s) 116, 118, and/or 120 may be third-party servers owned by a Consolidation Platform. In other examples, client-specific data may be stored in servers (in addition to or instead of local client devices and local databases) and may be tokenized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific tokens or unencrypted data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may be owned by a Reference Source. The client devices 102, 104, and/or 106 may download a third-party software program to tokenize the data. The tokens from the Reference Source may be stored locally in local databases 110, 112, and/or 114. In other examples, the tokens may be stored in remote databases/servers 116, 118, and/or 120. In other examples, the tokens may be harbored in both local and external databases. After tokenization, the Reference Source may transmit data via client device(s) 102, 104, and/or 106 that are configured to communicate with local databases 110, 112, 114 and servers 116, 118, and 120. The tokens from the Reference Source may be transmitted via network(s) 108 and/or satellite 122. The Reference Source tokens may be received by third-party servers.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
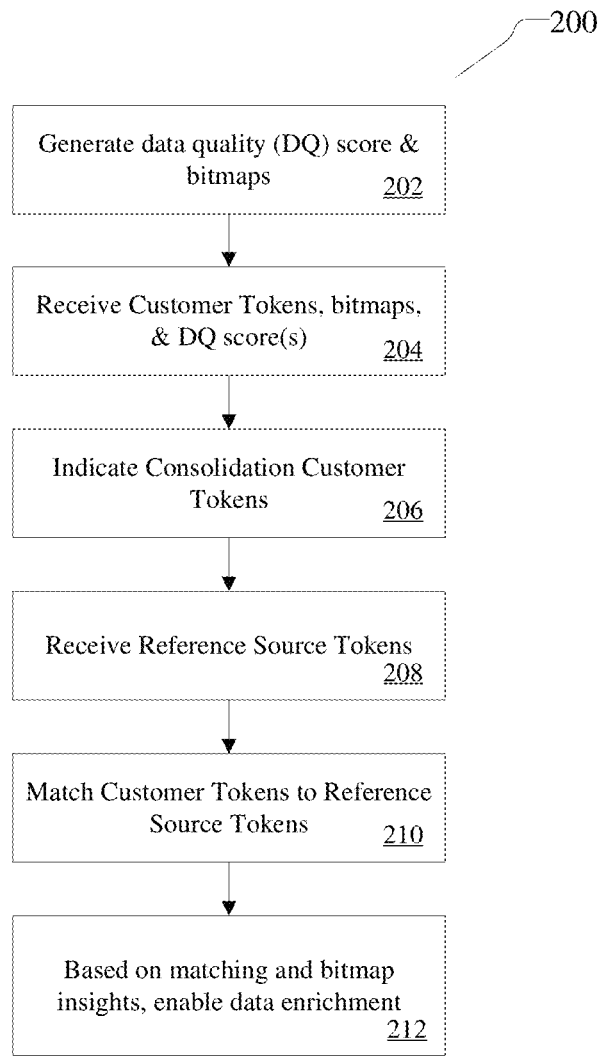
FIG. 2 illustrates an example method for masking, consolidating, matching, and enriching data, as described herein.

FIG. 2 illustrates an example method 200 for masking, matching, consolidating, and enriching data, as described herein. Method 200 may begin with step 202, generate a data quality (DQ) score. A DQ score may be assigned to each attribute in a record at the source (e.g., Customer or Reference Source environment). For instance, a composite record that is made up of multiple records that each have the same value for the "Name" data attribute may have a high DQ score for the "Name" data attribute. On the other hand, a data attribute in a composite that is derived from only a single data record (and not corroborated by other data records) may have a lower DQ score. The more corroboration a data attribute may possess, the higher the DQ score may be.

Furthermore, a DQ score may be influenced by the source of the data attribute. Specifically, Reference Sources that may be the source of a data attribute may receive higher DQ scores for those data attributes than if a data attribute was populated from a non-Reference Source. For example, a composite may be composed of five different data records, and only one of the data records has a certain data attribute (e.g., Social Security Number) populated. Normally, a data attribute without any corroboration from other data records would receive a lower DQ score. However, if the data attribute was derived from a Reference Source (e.g., government entity, credit bureau, etc.), then that particular data attribute may receive a higher DQ score. It is important to note that at the Consolidation Platform, the "data" attributes are tokenized, so the Consolidation Platform is viewing, analyzing, and matching "token" attributes rather than raw data attributes. Note that each token may be comprise a single attribute or multiple attributes. For instance, a single token may refer to a group of five attributes, or in some example aspects, the token may refer to a part of a single attribute. Tokens are not limited to one-to-one matching with attributes.

Additionally, at step 202, bitmaps may be created for the Customer records. The bitmaps may indicate the presence of certain attributes in a record. For example, in a record for an individual, each column may represent an attribute. In each column, the number "1" or the number "0" may be indicated. A "1" may indicate that the particular data attribute is present, and the number "0" may indicate that the particular data attribute is not present. For example, an individual record may indicate that the Address attribute is present with a "1," but if the individual record is missing an email address, then that attribute may have a "0" in that particular column. The bitmaps may be used to enable data enrichment, as particular data attributes are indicated as being present or absent. Analysis of such bitmaps may indicate to the Customer which data attributes are possible to obtain from other sources, such as Reference Source(s).

After the DQ scores and bitmaps are generated, the Customer tokens, bitmaps, and the DQ scores may be received by the third-party Consolidation platform at step 204. Prior to step 204, the Customer data may be tokenized at the Customer-side. Prior to receiving the Customer data, Customer client devices may have used a tokenization software program to hash and encrypt (or "mask") the raw Customer data prior to transmission, so what is actually transmitted to the Consolidation Platform are Customer "tokens." Once tokenized, the Customer tokens may be transmitted and received by the third-party Consolidation Platform at step 204. Note that receiving Customer tokens and DQ scores at step 204 and receiving Reference Source tokens at step 208 may be implemented simultaneously or in vice versa order (with reception of the Reference Source tokens happening before the reception of the Customer tokens).

The Customer tokens may be received by the Consolidation Platform and stored on secured servers. After reception of the Customer tokens, at least one composite (i.e., a consolidation of at least two Customer token records) may be indicated at step 206. A composite refers to the consolidation of multiple token records to create a single token record. For example, the Customer tokens may make up multiple token records associated with the same data subject (although, the third-party Consolidation Platform is unable to identify this data subject because the information is tokenized on the third-party Consolidation Platform). A composite of the data subject may be created by consolidating the multiple token records associated with that same data subject. Specifically, one token record may include tokens that, when referenced, represent data attributes such as Name, date of birth (DOB), Gender, and physical address, while another token record may include tokens that represent data attributes such as Name, email address, and age. The composite record, when referenced back via at least one look-up table (e.g., a table containing a third-party synthetic unique record ID table with one-to-one relation with a customer and/or reference source record IDs) or software/algorithm in the Customer environment and/or the Reference Source environment, would include all of the aforementioned data attributes: Name, DOB, Gender, physical address, email address, and age. The end result is a composite record, which is a more fulsome record associated with a certain data subject and/or entity. Such a composite record is created in the Customer Environment, so while the third-party Consolidation Platform may facilitate the identification of certain records to be consolidated and/or enriched, the actual consolidation and enrichment happens at the Customer Environment prior to transmission of the Customer tokens to the Consolidation Platform. As used herein, "data subject" may be a person, product, business, entity, etc. The systems and methods described herein are not limited to simply personal data related to human data subjects but can be applied to supply chain data, product data, business entity data, etc.

In other example aspects, a composite of a data subject may be created after the Consolidation Platform receives the Reference Source tokens at step 208. For instance, if record A and record B from the Customer tokens are matched up, there may not be enough similarities for there to be successful match. This may result in a false negative if record A and record B are indeed records associated with the same data subject. To remedy this false negative problem, the system may rely upon a tokenized Reference Source dataset. By using the Reference Source dataset, the system may use a technique known as transitive closure to accurately determine if record A and record B are associated with the same data subject, and if so, create a composite of those records. Record A may be matched up with the Reference Source token record, and Record B may be matched up with the Reference Source token record. If the comparison of the records reaches a certain matching threshold that confidently determines that record A matches with the Reference Source and that record B matches with the Reference Source (i.e., A=R and B=R), then we know that records A and B must match due to the transitive property.

The Reference Source tokens that may be used to help generate a composite of the Customer tokens may derive from a different Reference Source than the Reference Source token set that is received at step 208 and ultimately compared with the composite Customer tokens to populate missing and/or confirm low-DQ-score data attributes. In other example aspects, the Reference Source that is used to create the composite and match Customer records may be the same Reference Source that is received in step 208 and used to populate missing or low-DQ-score data attributes in the Customer tokens. In further examples, more than one Reference Source token set may be used to match tokens of the Customer token set and create a composite of the Customer tokens.

Reference Source tokens may be received at step 208. As noted earlier, the Reference Source tokens may be received prior to, simultaneously with, or after the Consolidation Platform receives the Customer tokens at step 202. Similar to the Receive Customer Tokens step at step 202, the Reference Source data may also be tokenized prior to transmission to the Consolidation Platform. The Reference Source devices may use a third-party tokenization software program (e.g., a tokenization software from the Consolidation Platform or another third-party) to tokenize its data prior to transmission. Once tokenized, the Reference Source tokens may be transmitted and received by the Consolidation Platform. The Consolidation Platform will now possess both Customer tokens and Reference Source tokens. As noted with respect to FIG. 1, these tokens may be stored on secured servers owned by the Consolidation Platform, third-party cloud servers, and/or local devices managed by the Consolidation Platform.

At step 210, the Customer tokens are matched up to the Reference Source tokens. The comparison of the Customer tokens to the Reference Source tokens may indicate whether certain Customer tokens match up to Reference Source tokens. Furthermore, bitmaps may indicate certain gaps in the Customer token records that may be filled in using the Reference Source token records. Note that the Reference Source tokens may be comprised of a single Reference Source and/or multiple Reference Sources. The matching and enrichment process may include analyzing the DQ scores for each of the attributes. The data attributes with the lowest DQ scores may receive higher priority than other data attributes with higher DQ scores. The data attributes that are completely missing may receive the highest priority during the comparison step at 210.

In some example aspects, a ranking of data attributes to be populated and/or confirmed for accuracy by the Reference Source tokens may be generated. The ranking of the data attributes may occur at the Consolidation Platform where the attributes are processed and ranked as tokens. The ranking of data attributes may be provided back to the Customer in a list form (where the Customer has access to the look-up table or software/algorithm to corelate to the source and data attributes), and each data attribute in the ranking list may have a monetary price associated with it. For instance, in order for the Customer to receive a certain populated data attribute, the Customer may need to pay a certain amount of money to receive that data attribute from the Reference Source. The Consolidation Platform may facilitate this transaction through the systems and methods described herein. The Customer may elect to populate/update certain data attributes and forgo populating/updating others.

After the matching analysis and the bitmap insights analysis is completed at step 210, data enrichment for the Customer may be enabled. For example, the token matching and bitmap insights from step 210 may have revealed that a Reference Source may possess a complete data record for a data subject that includes an email address, whereas client records A, B, and C did not have an email address associated with the data subject. The third-party Consolidation Platform notifies the Customer that a certain Reference Source has the email address data attribute, and as such, the Customer can obtain that data attribute from the Reference Source. The Consolidation Platform would recognize that the Customer token record has a missing token and would indicate the corresponding token from the Reference Source that can be used to populate the missing token record at the Customer environment. The Consolidation Platform facilitates the data enrichment process between a Customer and a Reference Source, but the actual population of missing data attributes or matching data records happens at the Customer environment, not on the Third-Party Consolidation Platform.

Figure 3:
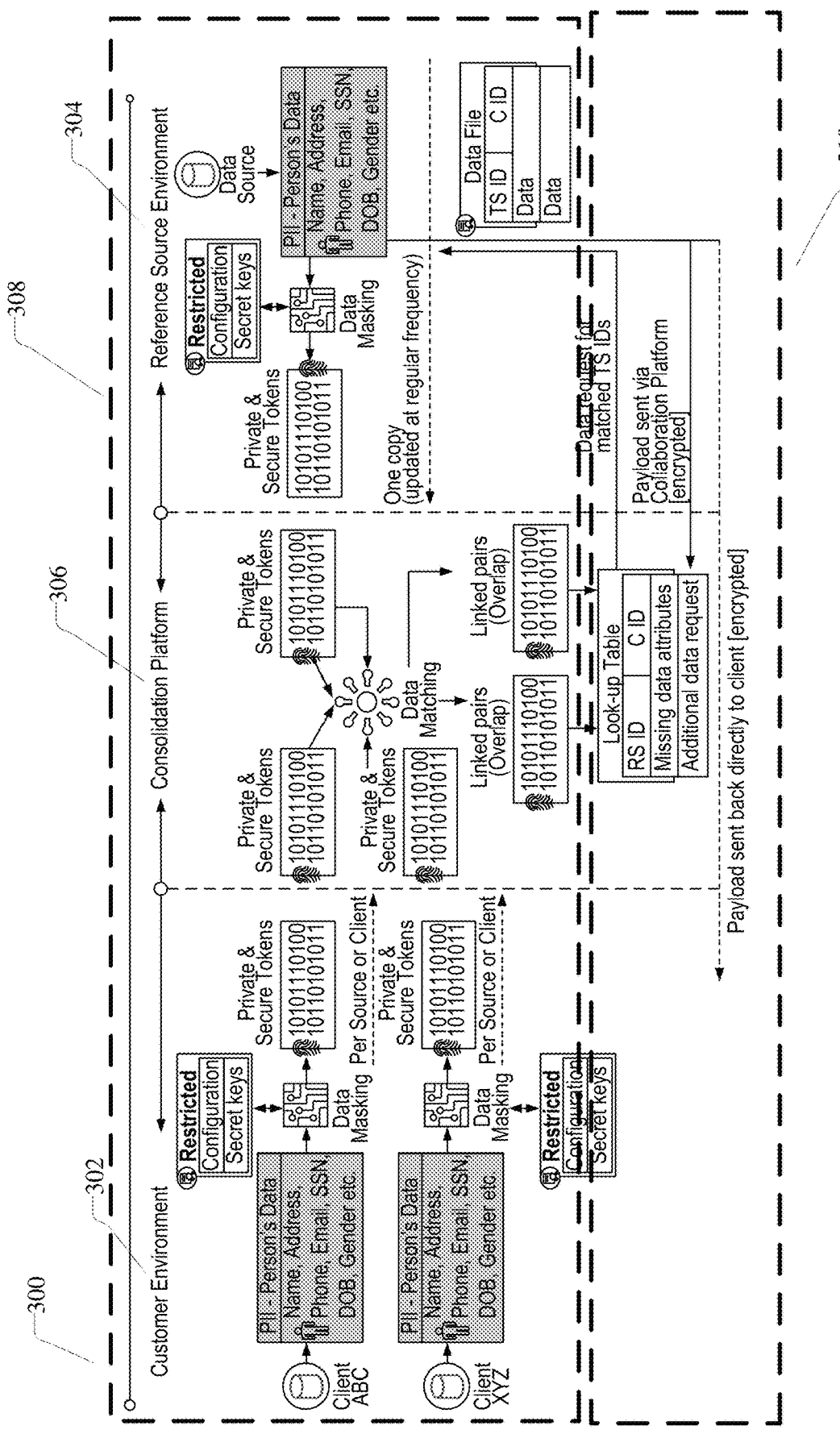
FIG. 3 illustrates an example of a distributed system that includes the Consolidation Platform, customer environment, and Reference Source environment.

FIG. 3 illustrates an example of a distributed system that includes the Consolidation Platform, Customer environment, and Reference Source environment. The distributed system in FIG. 3 is an example data registry 300. The data registry 300 may be comprised of the Customer environment 302, Reference Source environment 304, and Consolidation Platform 306. As shown in the Customer environment 302, data may be received from multiple Customer databases (e.g., databases Client ABC and/or Client XYZ). The data may contain multiple data attributes associated with a data subject, such as Name, Address, Phone, Email, SSN, DOB, Gender, etc. The Customer data may be tokenized inside of the Client Environment 302. Once tokenized, the client tokens may be transmitted to the Consolidation Platform 306.

Similarly, the Reference Source Environment 304 may include data that includes data attributes associated with a data subject. The data may be masked within the Reference Source Environment. After the data is masked, it may be transmitted to the Consolidation Platform 306.

The Consolidation Platform 306 may receive the tokens from the Customer and the Reference Source in the form of private and secure tokens. A similar tokenization algorithm may be applied to the Customer tokens as the Reference Source tokens to facilitate efficient matching and identification of missing data attributes in the Customer token set. Within the Consolidation Platform 306, the tokens from the Customer and the Reference Source may be compared. At the comparison step, linked pairs (i.e., "overlap") may be identified with tokens. In some examples, a record may also consist of a bit string (i.e., string of 1's and 0's). A "1" may indicate that a certain data attribute exists, whereas a "0" may indicate that the data attribute does not exist. When the tokens for a record are compared, if token or tokens of records have the same value then a linked pair is established based on an established threshold. The bitmap (bit string with 0s and 1s) for each matched pair independently highlights availability of data attribute for that record. For example, if the bit values in matched record pair are different, then at least one of the token records has the data attribute, whereas the other token record does not. If both token records have a "0" in the column, then that particular corresponding data attribute is missing.

The linked pairs may indicate that certain records match up (i.e., the data record from the client may be corroborated by the Reference Source). The comparison of bitmaps for the linked pairs may indicate that the data attribute is missing in the Customer bitmap highlighted by '0s' (and therefore missing from the Customer dataset in the Client Environment). Upon detecting an 0s in a linked pair, the Consolidation Platform system may generate a request back to the Reference Source to obtain and/or confirm a certain data attribute in a record set. The Reference Source may either transmit an encrypted payload (clear text data attributes) directly to customer or via the consolidation platform. The Consolidation Platform 306 does not harbor un-tokenized client (e.g., Customer and/or Reference Source) data.

For clarity, box 308 indicates the systems and processes for data matching, whereas the box 310 indicates the processes for data enrichment, which derive from bitmap insights.

Figure 4:
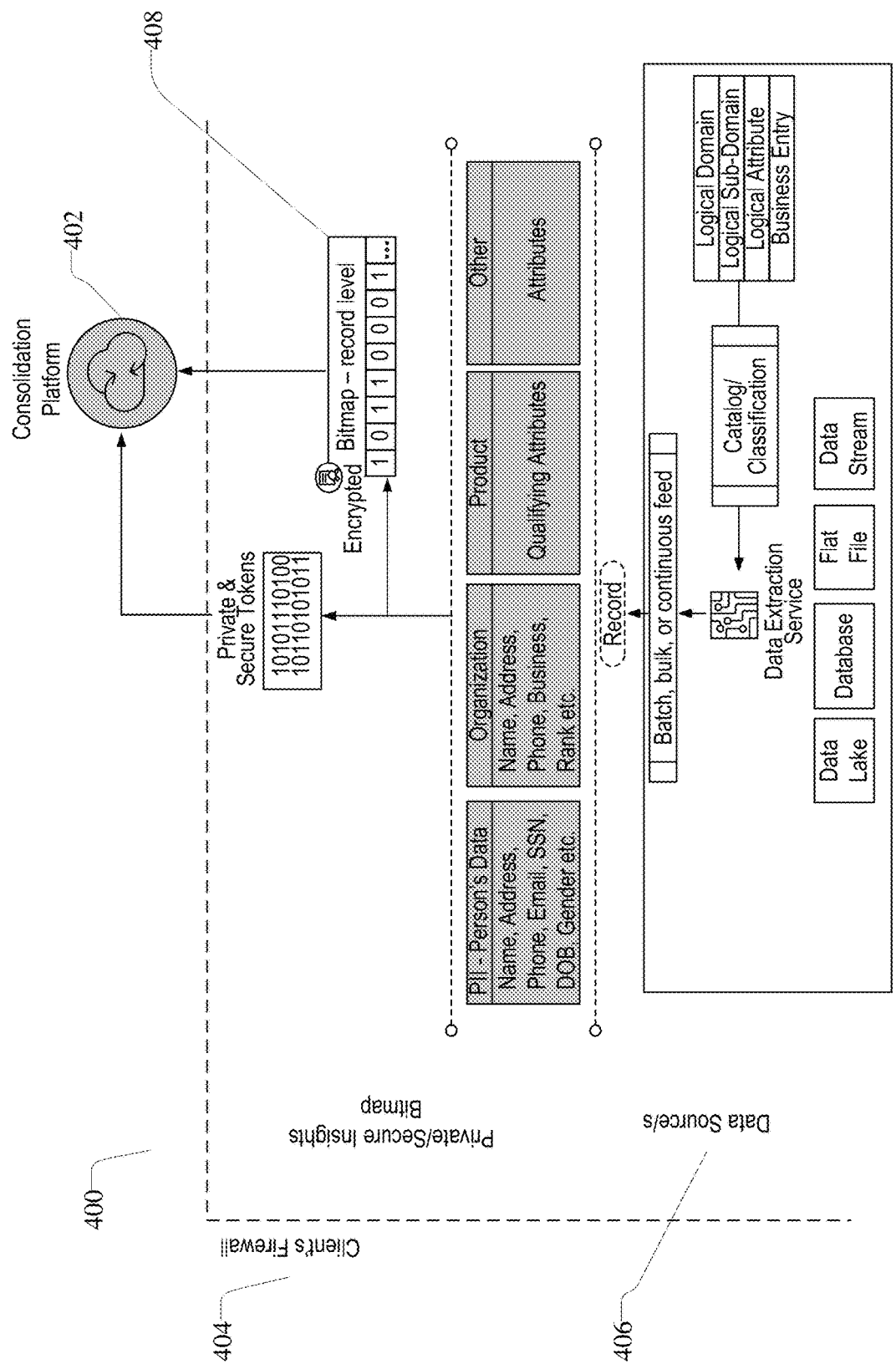
FIG. 4 illustrates example systems and methods for tokenizing data and creating bitmaps.

FIG. 4 illustrates an example architecture for tokenizing data and producing at least one bitmap. Architecture 400 is presented from the perspective of the client environment, meaning that the environment applies to either the Customer Environment or the Reference Source environment. The process for extracting and tokenizing data prior to transmitting the data to the Consolidation Platform 402 typically begins with identifying data sources 406. Data sources 406 may include but are not limited to data lakes, databases, flat files, and data streams. Data records in these data sources may be cataloged and classified according to logical domains and subdomains, logical attributes, and business entries. Such classifications may help organize the client data prior to tokenizing. For example, certain data attributes may include Name, Address, Phone, Email, SSN, DOB, Gender, etc. for a human data subject. Other data subjects may include a business entity/organization, a product, and other subjects.

Once the data is extracted, the data may be tokenized using at least one hashing algorithm and at least one encryption algorithm. The data may first be hashed and then encrypted. During tokenization, a Bitmap for every record may be generated, where each data attribute within a data record (or "token record" from the perspective of the Consolidation Platform) is represented by a series of 1's and 0's. The output of the tokenization algorithm may be a set of tokens and an encrypted Bitmap 408. The Bitmap may be utilized for the data availability analysis with a Bitmap of linked records from the Reference Source and/or from the Customer.

The data extraction, tokenization, and bitmap generation process occurs within the client environment, behind the client's firewall 404. Once the data extraction and tokenizing are complete, the tokenized data (private and secure tokens), and bitmap data may be transmitted to the Consolidation Platform 402.

Figure 5:
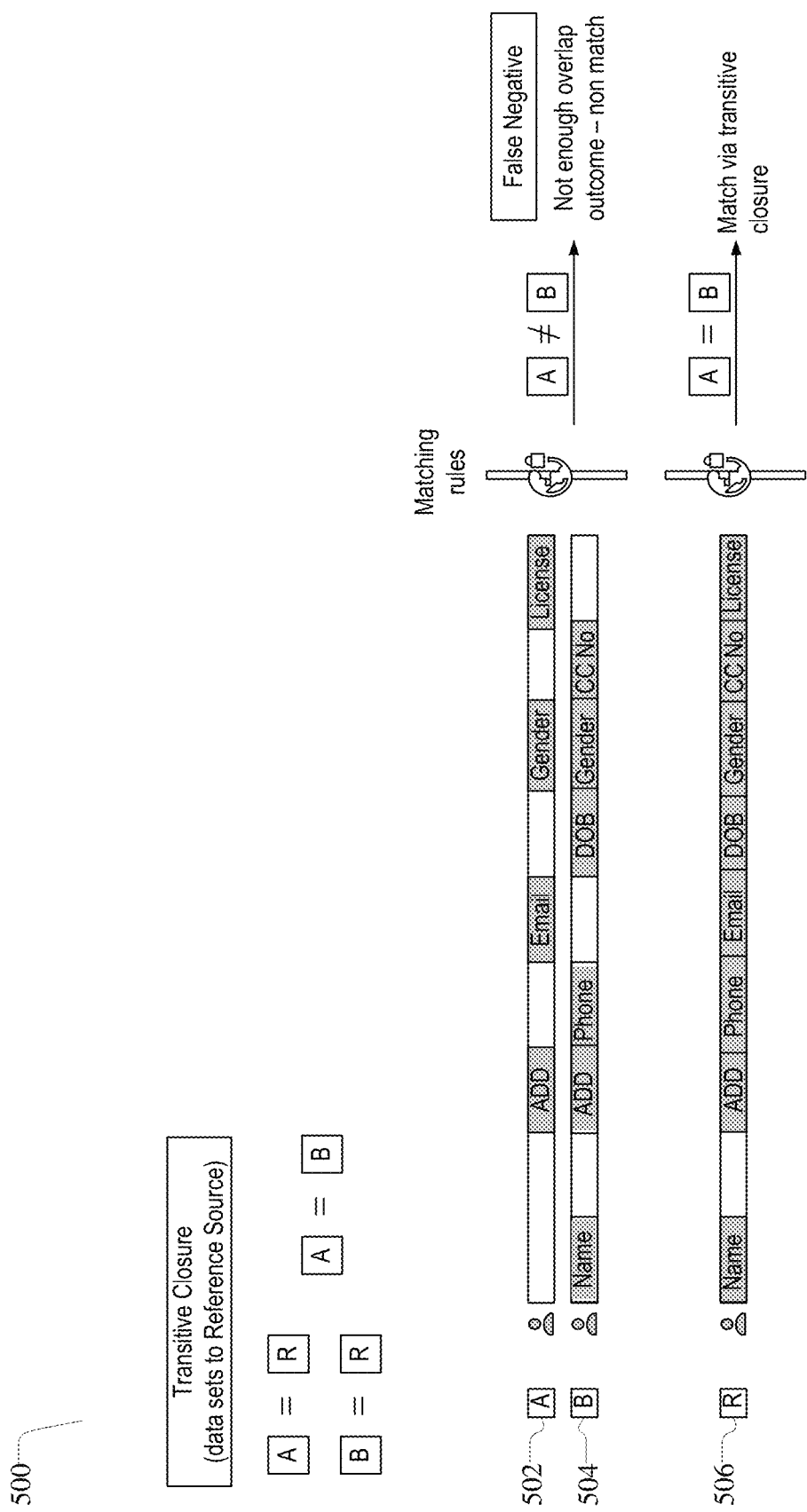
FIG. 5 illustrates an example of transitive matching using a Reference Source.

FIG. 5 illustrates an example 500 of transitive matching using a Reference Source. As illustrated in example 500, data records A (502) and B (504) may contain certain data attributes. Record A (502) may contain an address, email, gender, and license type. Record B (504) may contain name, address, phone, DOB, gender, and credit card number. When these two records are compared to create a "composite" record, however, the system may determine that there is not enough information/overlap between these two records to confidently determine that the records are related to the same data subject. In other words, comparing just record A and record B may result in a "false negative."

By introducing a Reference Source data record 506, records A and B can be matched via the transitive property. In other words, Record A may be compared to Record T, and sufficient overlap may be present to confidently determine that the records are associated with the same data subject. Record B may also be compared to Record T, and sufficient overlap may be present to confidently determine that the records are associated with the same data subject. As such, if Record A=Record T and Record B=Record T, then Record A=Record B.

The transitive matching example 500 may be applied when creating a composite of data records, such as in step 204 of method 200. At least one Reference Source may be utilized to determine whether certain Customer data records are associated with the same data subject.

Of note, at the Consolidation Platform, the transitive matching occurs via tokens—the data attributes displayed in FIG. 5 are for understanding purposes only, as the "data" that is actually received and processed by the Consolidation Platform is tokenized. In other words, the Consolidation Platform is blind to the underlying raw data that the tokens represent. The Consolidation Platform, for example, does not know whether Customer data record A and Customer data record B have matching Addresses. Rather, the Consolidation Platform knows that Customer token record A and Customer token record B have a matching token between the two token records, but the Consolidation Platform does not know that the matching token corresponds to the "Address" data attribute.

Figure 6:
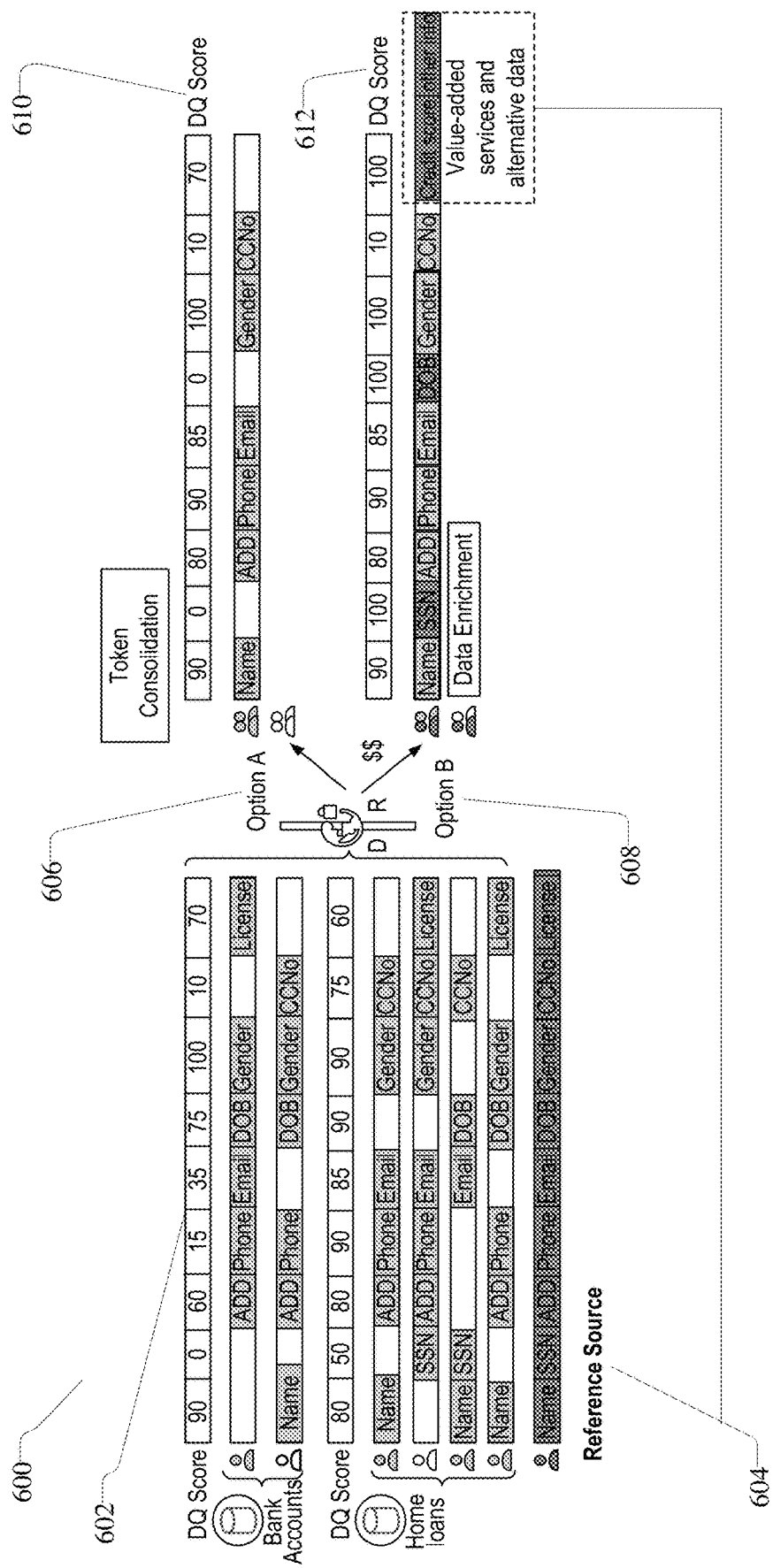
FIG. 6 illustrates examples of providing data quality (DQ) scores, consolidating multiple token records, and enriching records using at least one Reference Source.

FIG. 6 illustrates an example 600 of providing data quality (DQ) scores, consolidating multiple data records, and enabling the enrichment of data records using at least one Reference Source 604. In the example 600, Customer data may be derived from a Bank Accounts database and/or Home loans database (i.e., the Customer in this example is a Bank). The databases may comprise data records that are associated with the same data subject. For instance, an individual may have opened a checking account with the Customer. Upon opening a checking account, a data record may have been created for that individual. Later, the same individual may have applied for a home loan with the Customer, and a subsequent data record may have been created for the individual. Thus, at least two separate data records exist for the same individual—one in the Bank Accounts database and one in the Home loans database. Each of these data records may contain overlapping information, but either of the records may contain certain data attributes that the other data record does not possess. It may be advantageous for the Customer to consolidate these data records into a single composite data record.

Option A (606) for the client is to simply combine the data records from the Bank Account and the Home loan, but, as mentioned previously, there may not be sufficient overlap for the system to determine that these data records are, indeed, associated with the same individual. But just in case they do match, there may still be insufficient quality of data available for consolidated records in Option A. Option B (608) uses a Reference Source to create the composite. The data records from the Bank Account and the Home loan may be matched using the transitive property with the Reference Source, as described with respect to FIG. 5 and may provide superior data quality for the consolidated record.

As illustrated, the DQ scores 602 of the first data record associated with the Bank Accounts are overall lower than the DQ scores 610 and 612. Option A DQ Scores 610 shows the DQ Score for address as increasing from 60 (in DQ score 602) to 80 because the data record from Bank Account and data record from Home loans possessed the same address data attribute, but the DQ score for the Address attribute in the Home loans database is higher than the DQ score in the Bank Accounts database. Therefore, the system selects the higher DQ score data attribute. As such, the data quality of that data attribute increases because that data attribute has at least some corroboration. The missing data attributes are assigned a "0" score.

In Option B, by using the transitive property and at least one Reference Source 604, the client data may be enriched, as evidenced by the increased DQ scores 612. The DQ scores for previously missing data attributes (e.g., SSN and DOB attributes) may be increased and ultimately verified (score of "100") by the Reference Source dataset. In some example aspects, the Reference Source 604 may be a "universal" reference set, as described previously in FIG. 6. In some aspects, the Reference Source DQ scores for each data attribute is "100."

From the perspective of the Consolidation Platform, the consolidation of data records is actually in the form of tokens. The Consolidation Platform may receive multiple tokenized records from the Customer, and the Consolidation Platform may compare the token records and offer options of data consolidation from same customer data sources. Similarly, when the token records from the Customer are compared and processed with the Reference Source token set, the data enrichment options are enabled at the Customer environment. In other words, the Consolidation Platform simply identify missing data attributes in token records and enable data enrichment for the Customer token record, but the data enriched can only happen in Customer environment, the Customer is able to use at least one look-up table or software/algorithm to corelate sources records and obtain enriched data.

Figure 7:
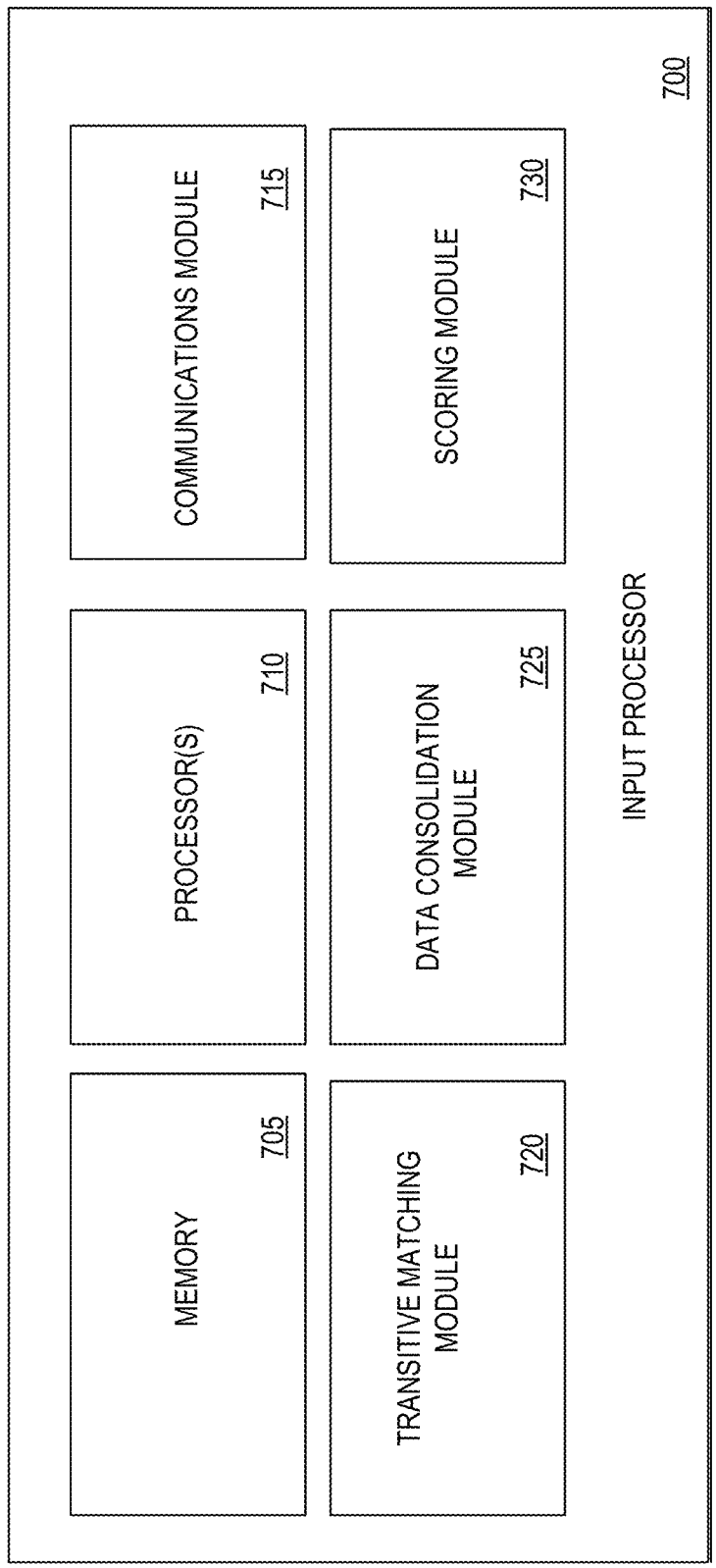
FIG. 7 illustrates an example input processor for implementing systems and methods for consolidating and enriching data, as described herein.

FIG. 7 illustrates an example input processor for implementing systems and methods for consolidating and enriching data, as described herein. Input processor 700 may be embedded within a client device (e.g., client devices 102, 104, and/or 106), remote web server device (e.g., devices 116, 118, and/or 120), and other devices capable of implementing systems and methods for consolidating and enriching data. The input processing system contains one or more data processors and is capable of executing algorithms, software routines, and/or instructions based on processing data provided by at least one client source and/or Reference Source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 7, the disclosed system can include memory 705, one or more processors 710, communications module 715, transitive matching module 720, data consolidation view module 725, and scoring module 730. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 705 can store instructions for running one or more applications or modules on processor(s) 710. For example, memory 705 could be used in one or more embodiments to house all or some of the instructions needed to execute the functionality of transitive matching module 720, data consolidation view module 725, and/or scoring module 730, as well as communications module 715. Generally, memory 705 can include any device, mechanism, or populated data structure used for storing information. In accordance with some embodiments of the present disclosures, memory 705 can encompass, but is not limited to, any type of volatile memory, nonvolatile memory, and dynamic memory. For example, memory 705 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 705 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 705.

Communications module 715 is associated with sending/receiving information (e.g., matched by transitive matching module 720, consolidated via data consolidation module view 725, and/or assigned a DQ and/or Value score via scoring module 730), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 715 sends information output by transitive matching module 720 (e.g., matched dataset), data consolidation view module 725 (e.g., a consolidated view at the attribute level, such as a table with record numbers as rows and attributes in the column labels filled by 0's and 1's to highlight the existence and/or absence of certain attributes in the record(s)), and/or by scoring module 730 (e.g., DQ scores associated with particular data attributes, Value scores associated with particular data records) to client devices 102, 104, and/or 106, as well as memory 705 to be stored for future use. In some examples, communications modules may be constructed on the HTTP protocol through a secure REST server(s) using RESTful services.

Transitive matching module 720 is configured to receive at least two sets of data, e.g., dataset A and dataset B. The module 720 may also receive and maintain a reference dataset (e.g., Reference Source dataset, universal reference set, etc.). Module 720 may be configured to compare dataset A to the reference dataset and compare dataset B to the reference dataset. The comparison analysis may reveal that dataset A matches sufficiently to the reference dataset and that dataset B matches sufficiently to the reference dataset. If dataset A matches to the reference dataset and dataset B matches to the reference dataset, then dataset A matches to dataset B via the transitive property. Transitive matching module 720 may also accept single data records and compare the data records to data records from the at least one dataset that is maintained by transitive matching module 720. Transitive matching module 720 is also configured to execute the transitive matching analysis on tokens. In other words, at least two token sets may be compared against a Reference Source token set, and if token set A matches to the Reference token set and token set B matches to the Reference token set, then token set A matches token set B via the transitive property.

Data consolidation view module 725 is configured to display a view of consolidated data at the attribute level. For example, the data consolidation view could be a table with record numbers set at each row and attributes set in each column (or vice versa). The table could be populated with 0's and 1's, reflecting the presence or absence of certain attributes in certain records. Module 725 is configured to receive at least two different tokenized datasets for matching and using bitmap to create a single composite potential data view. Module 725 may receive tokenized datasets via communications module 715 from different data sources (e.g., different databases from the Customer and/or from the Reference Source).

Scoring module 730 is configured to analyze a data attribute column and assign a data quality ("DQ") score to that data attribute. Scoring module 730 is also configured to analyze an entire record and its aggregated DQ scores and assign a Value score to the record. As previously illustrated, a compilation of data records may each indicate the same value for the DOB data attribute. As a result, the DOB data attribute column may receive a high DQ score because there are no missing values in that column, and the values in that column are all the same. Conversely, a data attribute column that may have missing (or blank) values and/or different values may receive a lower DQ score, since the data attribute quality cannot be corroborated without discrepancy. As mentioned previously, a Reference Source data attribute may receive a higher DQ score notwithstanding missing data attributes because of the already-verified reliability of the source of that data attribute (e.g., government entity, credit bureau, bank, etc.).

Figure 8:
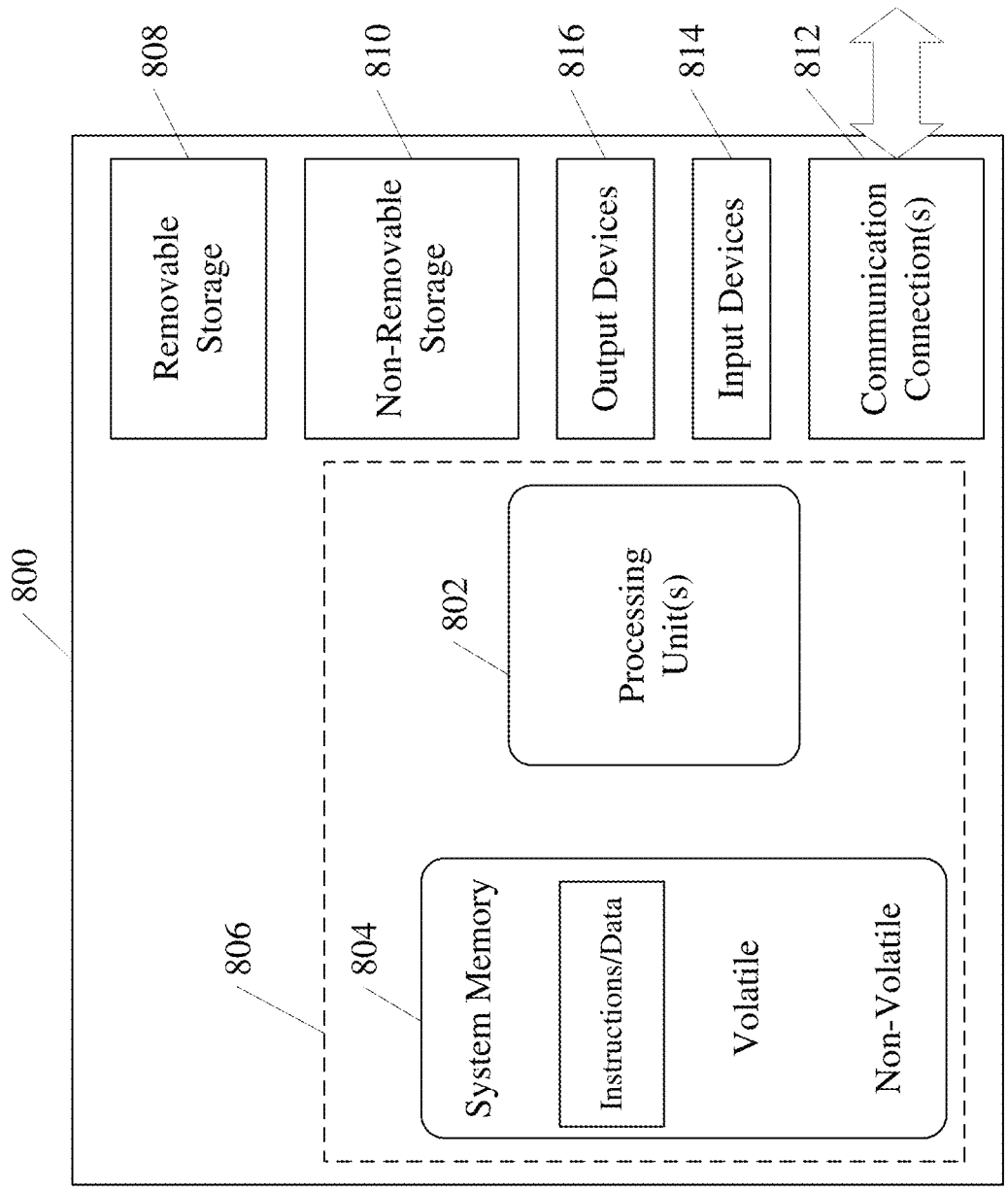
FIG. 8 illustrates one example of a suitable operating environment in which one or more of the present embodiments may be implemented.

FIG. 8 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 800 typically includes at least one processing unit 802 and memory 804. Depending on the exact configuration and type of computing device, memory 804 (storing, among other things, information related to detected devices, association information, personal gateway settings, and instructions to perform the methods disclosed herein) may be volatile (such as RAM), non-volatile (such as ROM, flash memory, etc.), or some combination of the two. This most basic configuration is illustrated in FIG. 8 by dashed line 806. Further, environment 800 may also include storage devices (removable, 808, and/or non-removable, 810) including, but not limited to, magnetic or optical disks or tape. Similarly, environment 800 may also have input device(s) 814 such as keyboard, mouse, pen, voice input, etc. and/or output device(s) 816 such as a display, speakers, printer, etc. Also included in the environment may be one or more communication connections, 812, such as LAN, WAN, point to point, etc.

Operating environment 800 typically includes at least some form of computer readable media. Computer readable media can be any available media that can be accessed by processing unit 802 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 800 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for enriching masked personal data without receiving identifiable personal information, comprising:
    a memory configured to store non-transitory computer readable instructions; and
    a processor communicatively coupled to the memory, wherein the processor, when executing the non-transitory computer readable instructions, is configured to:
        analyze a first attributes bitmap associated with a first record of a matched pair and analyze a second attributes bitmap associated with a second record of a matched pair, wherein the first record comprises masked personal data attributes and the second record is from a tokenized credit bureau report, wherein the first attributes bitmap includes personal data labels corresponding to the attributes represented by the first attributes;
        compare the first attributes bitmap and the second attributes bitmap;
        based on the comparison results of the first attributes bitmap and the second attributes bitmap, identify at least one missing data attribute and its corresponding personal data label from the first record of a matched pair; and
        identify at least one data attribute from the second records token set that corresponds with the at least one missing data attribute from the first records token set.

2. The system of claim 1, wherein the first matched pair comprises at least two token records.

3. The system of claim 2, the system further configured to enable consolidation of at least two records from the first matched pair to produce at least one composite.

4. The system of claim 3, wherein the composite is assigned at least one data quality score and one value score.

5. The system of claim 4, wherein the at least one data quality score is applied to a data attribute.

6. The system of claim 5, wherein the second record in a matched token pair is comprised of more than one credit bureau report.

7. The system of claim 1, wherein the comparison of the first record and the second record uses at least one token set.

8. The system of claim 2, wherein the at least two token records are matched with the second token set via transitive matching.

9. The system of claim 1, wherein the tokenized credit bureau report is a universal reference token set.

10. A method for enriching masked personal data without receiving identifiable personal information, comprising:
    receiving a first record set, wherein the first record set is in the form of a first attributes bitmap and a first token set, wherein the first token set comprises masked personal data attributes, and wherein the first attributes bitmap includes personal data labels corresponding to the attributes represented by the first attributes bitmap;
    receiving a second record set, wherein the second record set is in the form of a second attributes bitmap and a second token set, wherein the second token set comprises masked personal data attributes;

comparing the first attributes bitmap to the second attributes bitmap;

based on the comparison of the first attributes bitmap and the second attributes bitmap of matched record pairs, identifying at least one missing data attribute in the first attributes bitmap and its corresponding personal data label; and identifying the at least one missing data attribute from at least one credit bureau report having a reference source token set and a reference source attributes bitmap.

11. The method of claim 10, wherein the first record token set and the second record token set are masked with at least one of the following hashing and/or encryption algorithms: hashed message authentication code (HMAC) protocol, SHA2 512/256 token, TripleDES, Twofish, Blowfish, Advanced Encryption Standard (AES), IDEA encryption algorithm, MD5, and RSA.

12. The method of claim 11, wherein the first record token set and the second record token set are encrypted with the same encryption algorithm.

13. The method of claim 10, wherein the second record token set is derived from at least one tokenized credit bureau report.

14. The method of claim 10, further comprising:

consolidating data attributes from first record with the second record, wherein the consolidating generates at least one composite record based on the first record token set including bitmap and the second record token set including bitmap.

15. The method of claim 14, wherein the at least one composite token set is generated based on transitive matching.

16. The method of claim 10, wherein the second token set is derived from at least one universal reference token set, wherein the at least one universal reference token set is derived from more than one Source token sets.

17. The method of claim 10, wherein at least one data quality score is assigned to at least one data attribute in the first attributes bitmap and the second attributes bitmap.

* * * * *